United States Patent [19]

Damkier

[11] Patent Number: 5,513,373
[45] Date of Patent: Apr. 30, 1996

[54] APPARATUS USING THREE LIGHT EMITTING DIODES (LEDS) AND A TRANSISTOR FOR INDICATING WHETHER THERE IS AN OVERTERMINATION UNDERTERMINATION, OR POWER TERMINATION OF PERIPHERAL DEVICES

[75] Inventor: John L. Damkier, Tempe, Ariz.

[73] Assignee: Motorola, Inc., Schaumburg, Ill.

[21] Appl. No.: 210,854

[22] Filed: Mar. 21, 1994

[51] Int. Cl.$^6$ ..................... G06F 11/32
[52] U.S. Cl. ............... 395/836; 371/3; 371/22.1; 364/579; 326/30; 326/90
[58] Field of Search ............. 361/601–837; 326/30, 90; 307/296.6, 443; 340/825.5, 825.52; 364/200, 579; 371/3, 15.1

[56] References Cited

U.S. PATENT DOCUMENTS

| | | | |
|---|---|---|---|
| 3,976,849 | 8/1976 | Champan | 179/175.25 |
| 4,118,690 | 10/1978 | Paynton | 340/656 |
| 4,564,728 | 1/1986 | Romano | 179/175.3 R |
| 4,748,426 | 5/1988 | Stewart | 333/22 R |
| 4,756,017 | 7/1988 | Bush | 379/23 |
| 4,829,289 | 5/1989 | Kallman et al. | 340/656 |
| 4,831,283 | 5/1989 | Newton | 307/443 |
| 4,906,938 | 3/1990 | Konopka | 324/529 |
| 4,920,555 | 4/1990 | Ingalsbe | 379/21 |
| 5,239,559 | 8/1993 | Brach et al. | 375/36 |
| 5,422,580 | 6/1995 | Mandel et al. | 326/30 |

Primary Examiner—Thomas C. Lee
Assistant Examiner—Po Huang
Attorney, Agent, or Firm—S. Kevin Pickens

[57] ABSTRACT

In a computer system having a computer connected to peripheral devices, an illumination device is connected via a termination data line to a selected peripheral device. The illumination device provides illumination when current is supplied via the termination data line, thereby indicating the presence of at least one terminator in the peripheral devices. A second illumination device may be connected to the selected peripheral device via an overtermination data line and a termination power line for indicating the presence of more than one terminator among the peripheral devices when current supplied via the overtermination data line exceeds a threshold amount. A third illumination device may also be connected via the termination power line for indicating the presence of termination power when current is supplied via the termination power line.

6 Claims, 2 Drawing Sheets

APPARATUS USING THREE LIGHT EMITTING DIODES (LEDS) AND A TRANSISTOR FOR INDICATING WHETHER THERE IS AN OVERTERMINATION UNDERTERMINATION, OR POWER TERMINATION OF PERIPHERAL DEVICES

TECHNICAL FIELD

This invention relates generally to peripheral devices and, more particularly, to peripheral device termination.

BACKGROUND OF THE INVENTION

A computer is often connected to one or more peripheral devices, such as hard disk drives, tape drives, CD-ROM drives, and so forth. A popular interface for connecting such peripheral devices is the Small Computer Systems Interface (SCSI). SCSI is a parallel interface which connects up to seven peripheral devices to the computer in series in a daisy chain, called herein an SCSI chain.

The computer sends data to a given peripheral device by sending the appropriate data signals down the SCSI chain. When the data signals reach the last peripheral device at the end of the SCSI chain, they return in the other direction. This results in an imbalanced impedance in the SCSI chain. The imbalanced impedance prevents the peripheral devices from functioning correctly. Typically, this problem has been solved by providing "terminators" to the SCSI chain. The terminators absorb the data signals and maintain a balanced impedance on the SCSI chain.

In order for the computer and peripheral devices on the SCSI chain to function correctly, a normal "termination status" must be maintained. That is, exactly two terminators must be present, one on the first peripheral device and one on the last peripheral device in the SCSI chain. The termination status of the SCSI chain can change, however. When peripheral devices are added to or removed from the SCSI chain, for example, too many or too few terminators may remain. As a result, the computer and/or peripheral devices can malfunction or even shut down entirely.

When a malfunction or shutdown does occur in the computer system, it becomes essential to determine whether an incorrect termination status is the cause. If so, it is further essential to determine whether the problem is the result of having too few or too many terminators in the SCSI chain, an absence of termination power, or a different problem altogether. This determination can be a lengthy and complicated process, often requiring the examination of each peripheral device by a skilled engineer. In many instances, it is not feasible to maintain the engineer at the site of the computer system, and thus a time-consuming relocation is required whenever such a malfunction or shutdown occurs.

Many businesses depend on the continued operation of a computer system such as the one described above. Thus, the time wasted in diagnosing a computer or peripheral malfunction or shutdown in the manner described above can be very costly. Therefore, there is a need for a more efficient way to determine the termination status of peripheral devices.

SUMMARY OF THE INVENTION

An embodiment of the invention provides an apparatus for indicating the termination status of peripheral devices in a computer system. A termination data line is coupled to a selected peripheral device and to an illumination device. The illumination device provides illumination when the termination data line supplies current to the illumination device, thereby indicating the presence of at least one terminator among the peripheral devices.

In another aspect of the invention, an overtermination data line is also coupled to the selected peripheral device and to a second illumination device. A transistor is provided along the overtermination data line and allows current to flow when the current supplied to the transistor exceeds a threshold amount corresponding to the presence of more than one terminator among the peripheral devices. The second illumination device provides illumination when the transistor allows current to flow to the second illumination device via the overtermination data line, thereby indicating the presence of multiple terminators among the peripheral devices.

In still another aspect of the invention, a termination power line is also coupled to the selected peripheral device and to a third illumination device. The third illumination device provides illumination when the termination power line supplies current to the third illumination device, thereby indicating the presence of termination power.

DESCRIPTION OF THE PREFERRED EMBODIMENTS

Figure 1:
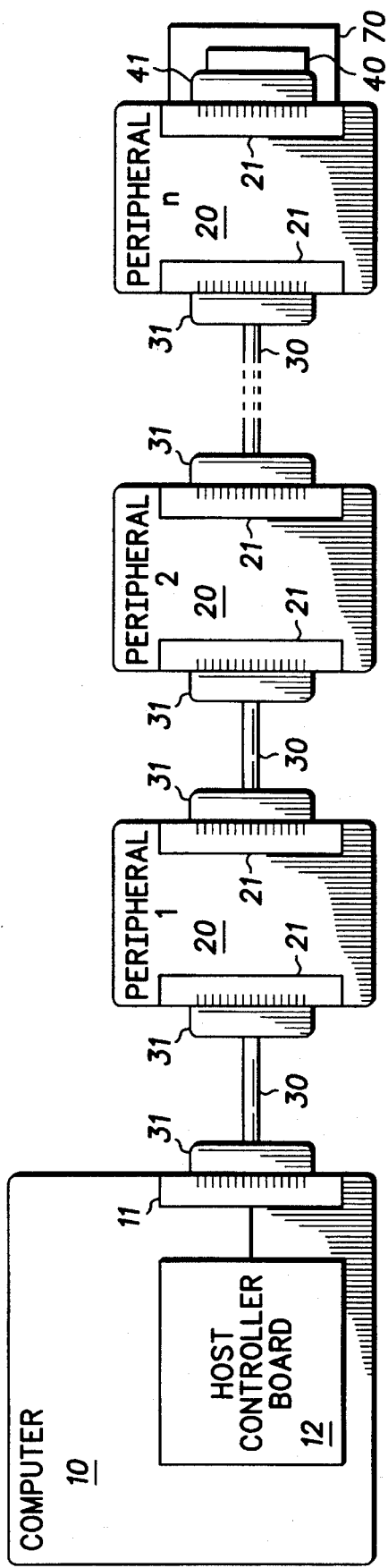
FIG. 1 is a block diagram of a computer system utilizing a termination status device configured in accordance with the invention.

In a preferred embodiment of the present invention, an apparatus is provided for indicating the termination status of peripheral devices connected to a computer via a Small Computer Systems Interface (SCSI) chain. A computer system utilizing this apparatus and method is shown in FIG. 1. In FIG. 1, computer 10 includes host SCSI port 11 connected to host controller board 12. The computer 10 is connected via the host SCSI port 11 to a plurality of peripheral devices 20 (peripheral 1, peripheral 2, . . . peripheral n), composing an SCSI chain. The peripheral devices 20 each have at least two peripheral SCSI ports 21 and are connected with SCSI cables 30 as shown. The SCSI cables 30 have SCSI connectors 31 on each end which plug into the SCSI ports 21 and host SCSI port 11.

The termination status of the peripheral devices 20 is indicated by termination status device 40. The termination status device 40 is connected to the last peripheral device 20 in the SCSI chain (peripheral n). The termination status device 40 includes a conventional Centronics-type SCSI connector 41. The Centronics-type SCSI connector 41 is plugged into the available SCSI port 21 in the last peripheral device 20 in the SCSI chain (peripheral n). The termination status device 40 temporarily replaces an external terminator (not shown) which is ordinarily plugged into the available peripheral SCSI port 21 in the last peripheral device 20 (peripheral n). Thus, one of the two terminators required for a normal termination status has been removed when the termination status device becomes operable. For this reason, the termination status device 40 indicates a normal termination status when exactly one terminator remains in the peripheral devices. Similarly, the termination status device indicates an overtermination status when more than one terminator remains in the peripheral devices.

Figure 2:
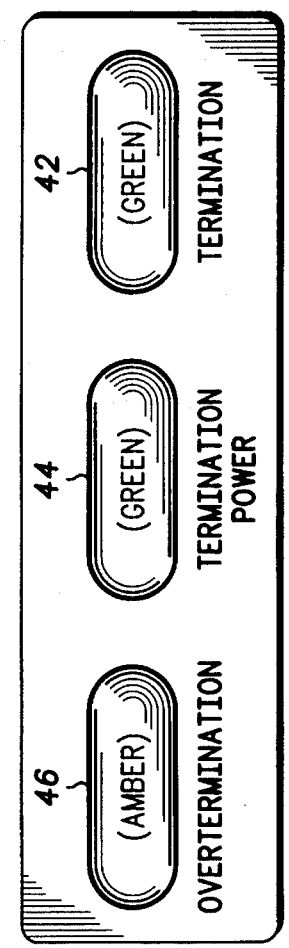
FIG. 2 is an external end view of the termination status device showing a termination light, an overtermination light and a termination power light.

The output provided by the termination status device 40 is shown in FIG. 2. FIG. 2 is an external end view of the termination status device 40 on the side opposite the side having the SCSI connector 41. As shown in FIG. 2, the termination status device 40 includes a "termination light" 42. The termination light 42 is illuminated when at least one terminator is present in the SCSI chain. As the presence of one terminator indicates a correct status, the termination light 42 is preferably a green light. By observing the termination light 42, a user of the computer system of FIG. 1 can quickly and easily determine whether any malfunction or shutdown of the computer system is the result of too few terminators being present within the SCSI chain.

The termination status device 40 also includes a "termination power" light 44 which is illuminated when termination power exists among the peripheral devices. As this is also a correct status, the termination power light 44 is also preferably a green light. By observing the termination power light 44, the user can easily determine whether any problem with the computer system of FIG. 1 is the result of an absence of termination power in the computer system.

The termination status device 40 further includes an "overtermination" light 46 which is illuminated when multiple terminators are present on the SCSI chain. As an external terminator has been removed from the last peripheral device 20, more than one remaining terminator signifies an incorrect termination status indicating the presence of too many terminators in the SCSI chain. Thus, the overtermination light 46 is preferably an amber light. By observing the overtermination light 46, the user can easily determine whether any problem with the computer system is the result of too many terminators being present in the SCSI chain.

Figure 3:
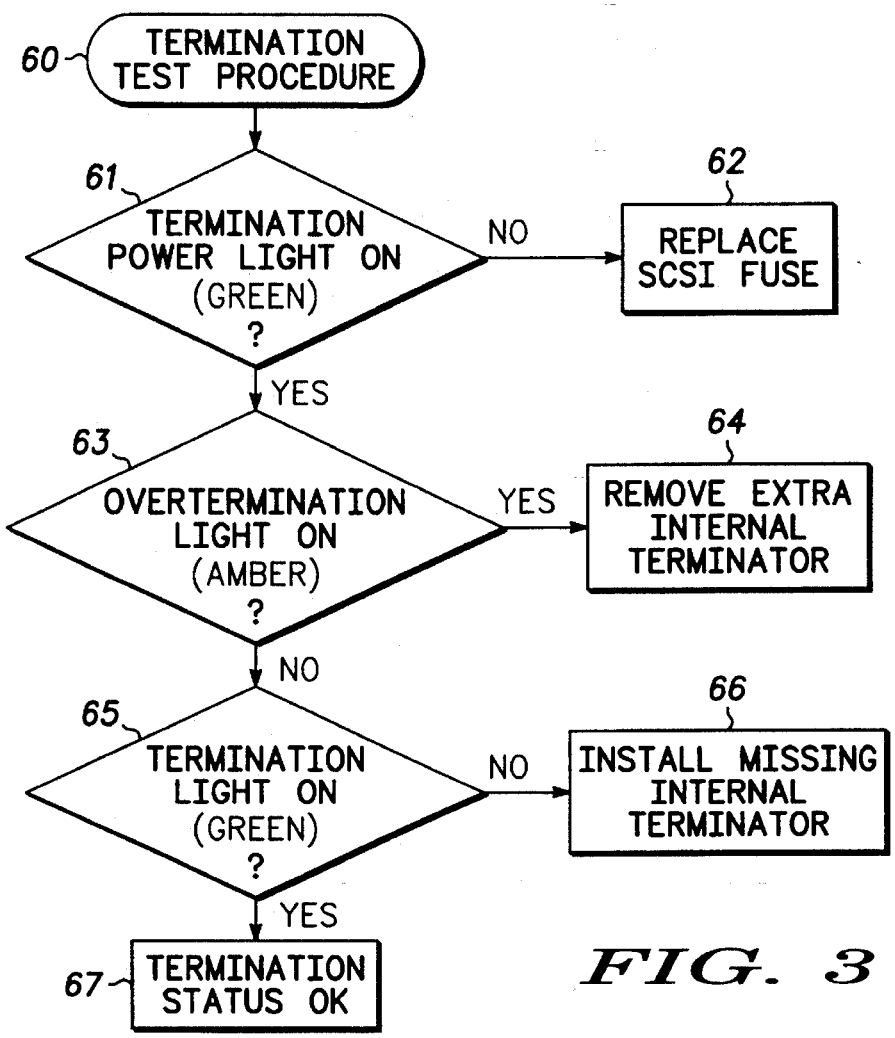
FIG. 3 is a flowchart of a method for using the termination status device to determine the termination status of peripheral devices.

Based on the output of the termination status device 40 described above, a user quickly and easily determines the termination status of the computer system. When the termination status device 40 is connected to the last peripheral device 20 in the SCSI chain (peripheral n), the user then follows the Termination Test Procedure 60 shown in FIG. 3.

In step 61 of the Termination Test Procedure 60, the user determines whether the termination power light 44 is on (green). If not, the user determines in step 62 that a "Termpwr" fuse provided on the host controller board 12 must be replaced. If the termination power light 44 is determined to be on in step 61, then the user proceeds to determine whether the overtermination light 46 is on (amber) in step 63. If so, the user determines in step 64 that an extra terminator must be removed from one of the peripheral devices 20 in the SCSI chain 50. If the overtermination light 46 is not on, then the user proceeds to determine whether the termination light 42 is on (green) in step 65. If not, then the user determines in step 66 that a missing internal terminator must be installed. If the termination light is on in step 65, then the presence of a single terminator is indicated. Thus, the user determines in step 67 that the termination status is OK.

Figure 4:
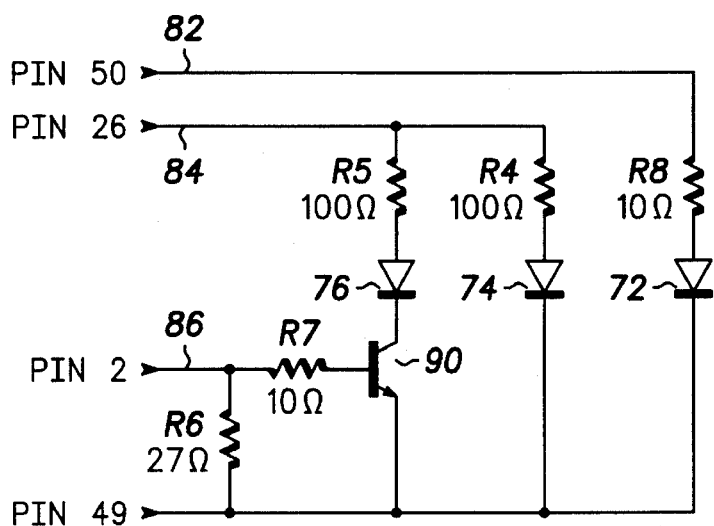
FIG. 4 is a schematic diagram of a termination status circuit within the termination status device.

The operation of the termination status device 40 will now be explained with reference to FIG. 4. FIG. 4 is a circuit diagram of termination status circuit 70. The termination status circuit 70 is provided within the termination status device 40 and controls the illumination of termination light 42, termination power light 44 and overtermination light 46. The termination status circuit 70 is connected to the Centtonics-type SCSI connector 41 in the termination status device 40 via the DB0 pin (pin 2), the I/O pin (pin 50), the Termpwr pin (pin 26) and the Ground pin (pin 49) of the Centtonics-type SCSI connector 41.

When at least one terminator is present within the SCSI chain, the I/O pin (pin 50) supplies current to a conventional light emitting diode (LED), called herein termination LED 72. The I/O pin supplies current to the termination LED 72 via a data line connected to the I/O pin, called herein termination data line 82. A 10 ohm resistor R8 is provided along the termination line 82 to protect the termination LED 72 against a mis-wired cable. When current is supplied to the termination LED 72, the termination LED 72 emits a green light to illuminate the termination light 42. Thus, the presence of at least one terminator is indicated by the termination status device 40. When no terminators are present in the SCSI chain, however, then the I/O pin (pin 50) supplies no current to the termination light 72, and the termination light 42 is not illuminated.

When termination power is present in the SCSI chain, the Termpwr pin (pin 26) provides 4–5 volts to supply current to a conventional LED, called herein termination power LED 74. The Termpwr pin supplies current to the termination power LED 74 via a line connected to the Termpwr pin, called herein termination power line 84. A 100 ohm resistor R4 is provided along the termination power line 84. The resistor R4 limits the current through the termination power LED 74. When current is supplied to the termination power LED 74, the termination power LED 74 emits a green light to illuminate the termination power light 44. Thus, the presence of termination power within the SCSI chain is indicated by the termination status device 40. Termination power is normally present within the SCSI chain unless the host controller board 12 contains a burned-out Termpwr fuse. In such a case, then the Termpwr pin (pin 26) supplies no current to the termination power LED 74, and the termination power light 44 is not illuminated.

When more than one terminator is present in the SCSI chain, the DB0 pin (pin 2) supplies current to conventional LED 76, called herein overtermination LED 76. In such a case, the DB0 pin (pin 2) supplies current to the overtermination LED 76 via a data line connected to the DB0 pin, called herein overtermination data line 86. Transistor 90 is provided along the overtermination data line 86. Transistor 90 is a Motorola transistor, part number 2N4401, which is an npn silicon transistor produced by Motorola, Inc. A 10 ohm resistor R7 is also provided along the data line 86 to regulate the current through the transistor 90. A 27 ohm resistor R6 is provided between the overtermination data line 86 and a line to the ground pin (pin 49).

The presence of more than one terminator in the SCSI chain causes at least a 0.6 V voltage drop across the resistor R6. The 0.6 V drop is sufficient to allow the current supplied to the transistor 90 to exceed a threshold amount of approximately 0.001 amp. When this threshold amount is exceeded, the transistor 90 saturates and enables current to flow through the overtermination LED 76. A 100 ohm resistor R5 is also provided between the termination power line 84 and the overtermination LED 76. The resistor R5 limits the current through the overtermination LED 76.

When the transistor 90 allows current to flow through the overtermination LED 76, the overtermination LED 76 emits an amber light to illuminate the overtermination light 46. Thus, the presence of too many terminators is indicated by the termination status device 40. When one terminator or no terminators are present in the SCSI chain, the transistor 90 does not saturate. Thus, current does not flow through the overtermination LED 76, and the overtermination light 46 is not illuminated.

While specific embodiments of the invention have been shown and described, further modifications and improvements will occur to those skilled in the art. It is understood that this invention is not limited to the particular forms shown and it is intended for the appended claims to cover all modifications of the invention which fall within the true spirit and scope of the invention.

What is claimed is:

1. An apparatus for indicating a termination status of a computer system having peripheral devices coupled to a computer, at least one of the peripheral devices having a small computer systems interface port, the apparatus comprising:

a small computer systems interface connector connected to the small computer systems interface port and having a first pin, a second pin and a third pin;

a first light emitting diode connected to the first pin via a first data line and emitting light when the first data line supplies current to the first light emitting diode;

a second light emitting diode connected to the second pin via a power line and emitting light when the power line supplies current to the second light emitting diode;

a transistor connected to the third pin via a second data line and enabling current to flow when the second data line supplies a current exceeding a threshold amount;

a third light emitting diode connected to the power line and connected to the transistor and emitting light when the power line supplies current to the third light emitting diode and the transistor enables current to flow to the light emitting diode.

2. An apparatus for indicating a termination status of peripheral devices in a computer system, the apparatus comprising:

a termination data line coupled to a selected peripheral device of the peripheral devices;

an illumination means, coupled to the termination data line, for providing illumination when the termination data line supplies current to the illumination means, thereby indicating a presence of at least one terminator in the peripheral devices;

a termination power line coupled to the selected peripheral device;

an overtermination data line coupled to the selected peripheral device;

a transistor coupled to the overtermination data line and enabling current to flow when the current supplied to the transistor exceeds a threshold amount corresponding to a presence of more than one terminator in the peripheral devices; and a second illumination means, coupled to the overtermination data line and to the termination power line, for providing illumination when the termination power line supplies current to the second illumination means and when the transistor enables current to flow to the second illumination means via the overtermination data line, thereby indicating the presence of more than one terminator in the peripheral devices.

3. The apparatus of claim 2, further comprising a third illumination means coupled to the termination power line for providing illumination when the termination power line supplies current to the third illumination means, thereby indicating an existence of termination power among the peripheral devices.

4. The apparatus of claim 3, further comprising a connector having a first pin connected to the termination data line, a second pin connected to the overtermination data line and a third pin connected to the termination power line.

5. The apparatus of claim 4 wherein the connector comprises a small computer systems interface connector coupled to the selected peripheral device via a small computer systems interface port within the selected peripheral device.

6. The apparatus of claim 3 wherein the illumination means comprises a first light emitting diode emitting light when the termination data line supplies current to the first light emitting diode, the second illumination means comprises a second light emitting diode emitting light when the termination power line supplies current to the second light emitting diode and when the transistor enables current to flow to the second light emitting diode via the overtermination data line, and the third illumination means comprises a third light emitting diode emitting light when the termination power line supplies current to the third light emitting diode.

\* \* \* \* \*